3,429,148
MULTI-STAGE FILTER SYSTEM FOR
DRY CLEANING
George M. Worthington, 7817 Grove Ave.,
Shrewsbury, Mo. 63119
Filed Jan. 3, 1966, Ser. No. 518,477
U.S. Cl. 68—18      6 Claims
Int. Cl. B01d 25/04

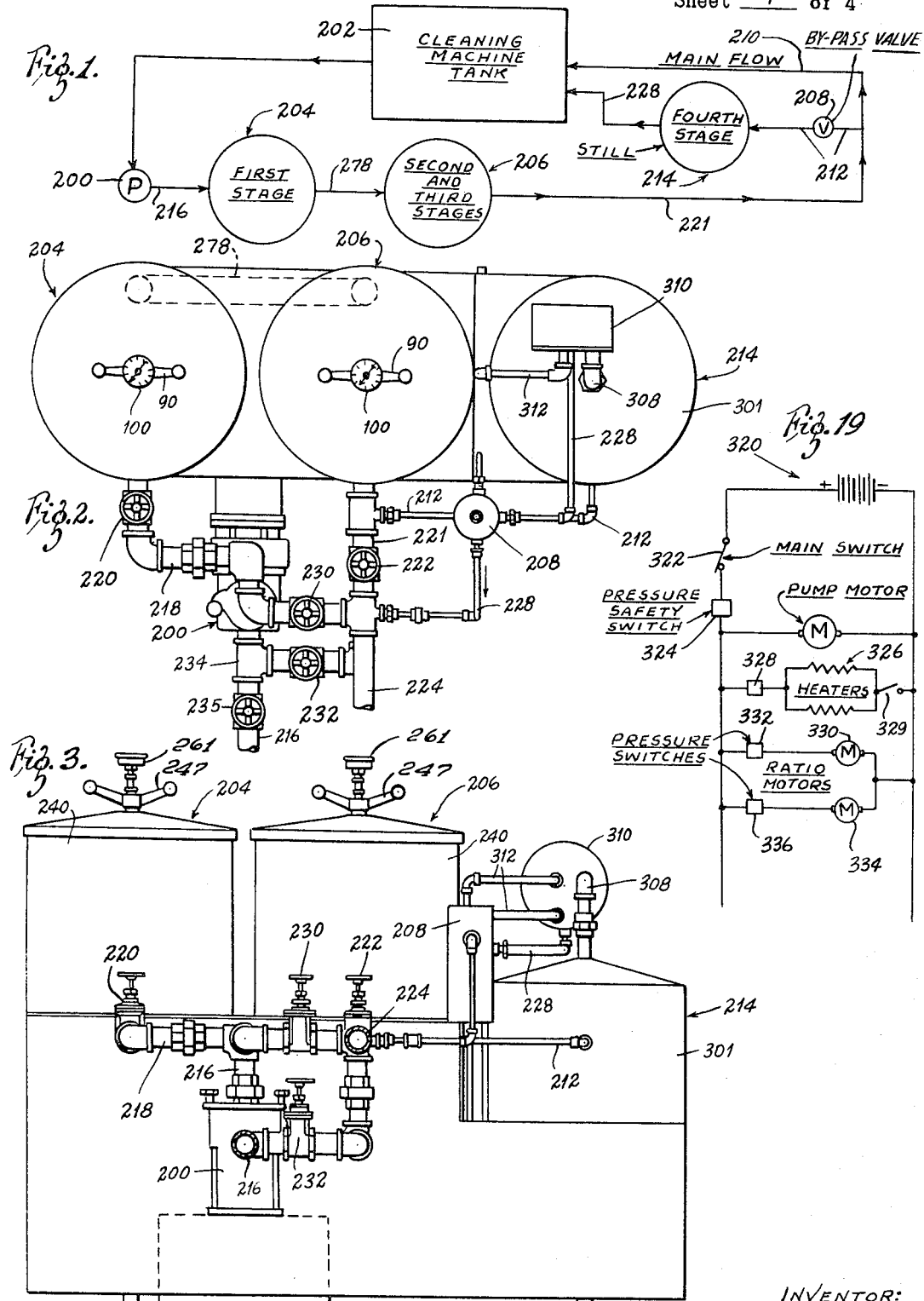

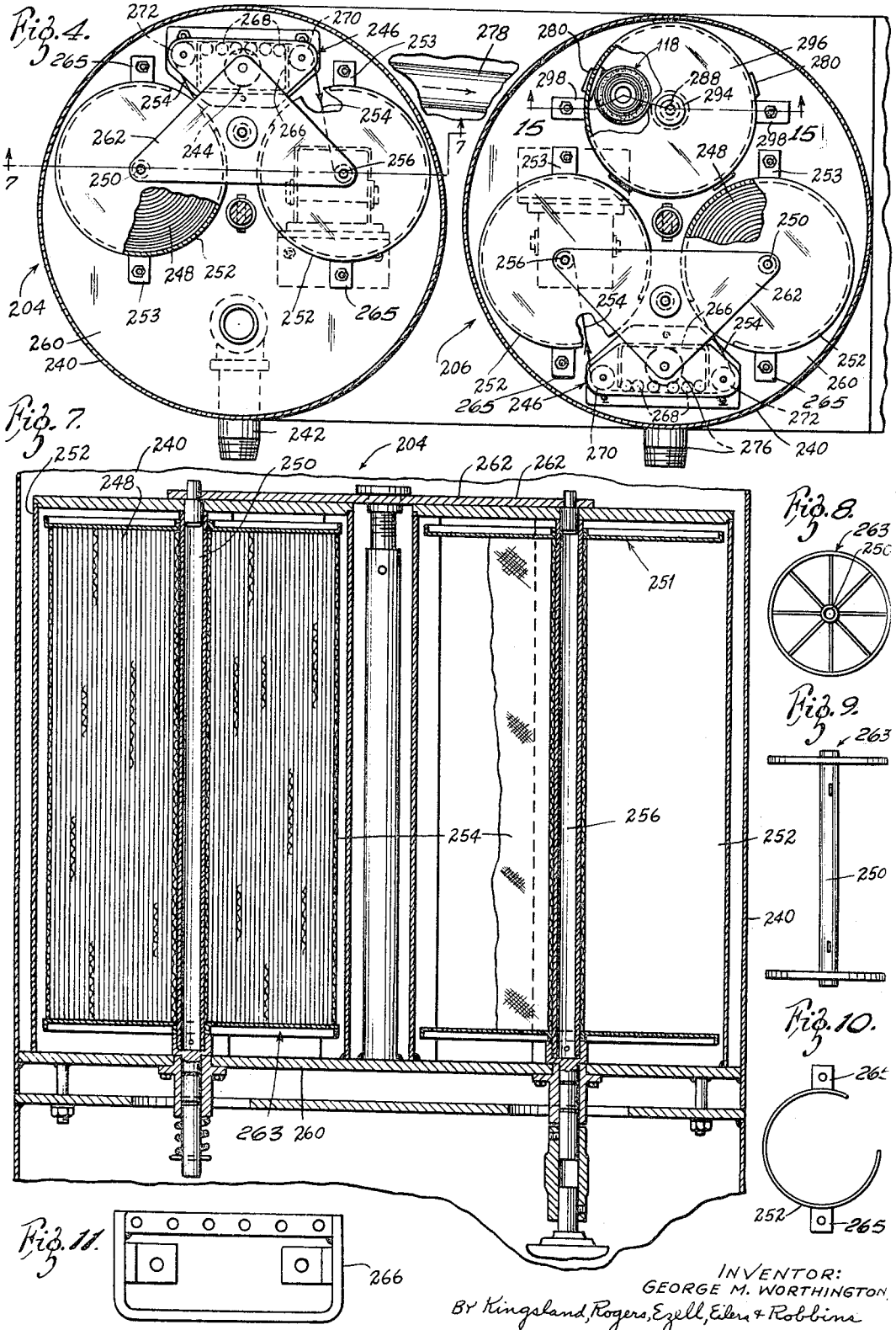

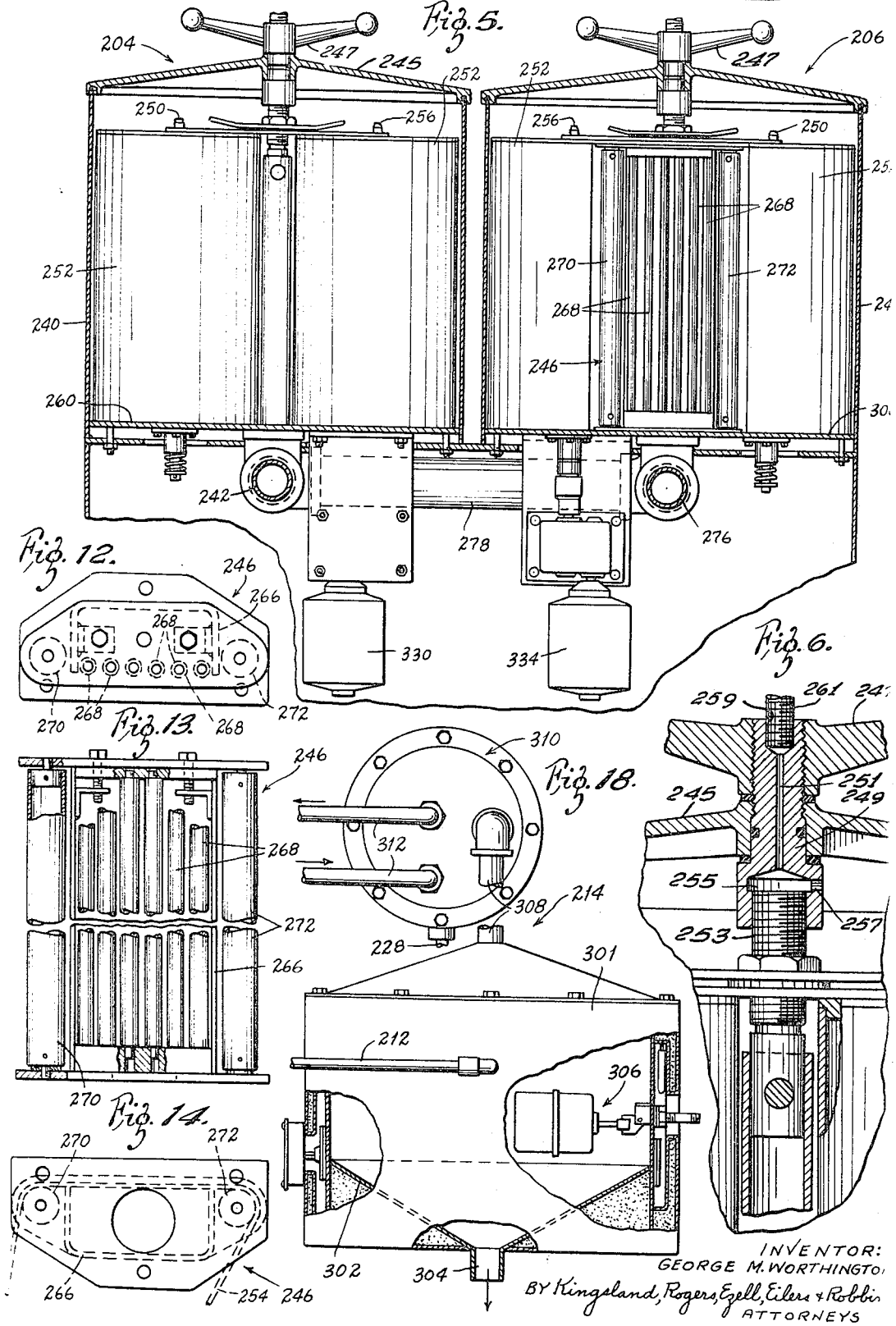

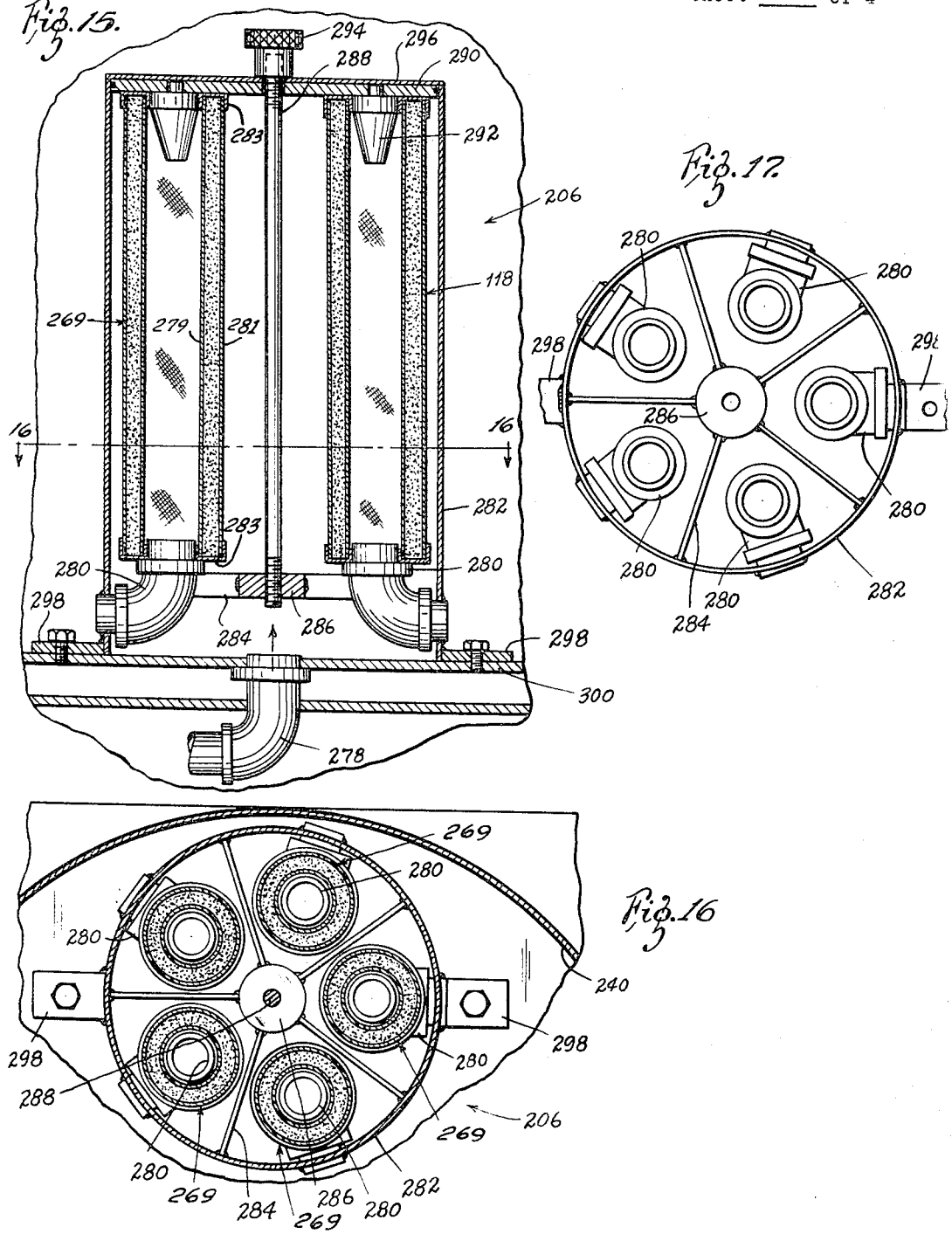

ABSTRACT OF THE DISCLOSURE

An improved multi-stage dry cleaning system for removing lint, dirt, fatty acids, and color from dry cleaning solvents. A filter means is used in one stage presenting a fresh area of filter media as it becomes clogged with solvent. The filter is unwound from a reel to a motor driven wind-up reel. A pressure-sensitive switch operates upon the back pressure to control the movement of the filter media when it becomes clogged. The system also employs a package battery of annularly positioned cylindrical cartridges for filtering in another stage.

---

In present day dry cleaning systems, filter units are employed utilizing the so-called precoat method. In these systems filter media, such as bags, mesh metal tubes, or screens are coated with diatomaceous earth and powdered carbon by introducing this powder material directly into the sump tank of the cleaning machine where it is picked up by the solvent pump and deposited on the filter media. Dirty solvent is forced through this arrangement by a pump and the powder plus dirt, lint, fat, and the like, form the residue known as muck, which is removed periodically and the filter media is then freshly coated.

By means of this invention, there are created separate filtration stages using disposable filter media where each of the stages are designed to eliminate one of the four major contaminants, namely, lint, dirt, fatty acid, or other non-volatile matter and discoloration due to dyes, etc. In arranging these stages, a compact design has been provided in a plurality of stages.

In my concept of providing for multi-stage filtration for dry cleaning solvents with the utilization of disposable filter media, I have provided rolls of disposable filter media wrapped around suitable spindles, in which the media moves automatically on a pressure signal to present fresh material over the gate in the filter area as the material becomes clogged with impurities. This concept, through automation, can be very simply operated with a minimum of attention and maintenance.

In my preferred embodiment, using a movable filter media, it will be understood that, although a reel or spool-type of arrangement or cylinder arrangement is used to feed a roll of filter media, any other type of arrangement whereby filter material in the form of a sheet or like that can be moved from the source of supply, such as in a pleated accordion arrangement, past a filter area may be utilized. In this embodiment, using filter media on a roll, the filter media from one roll is housed in a cylindrical shaped shell and fed across the filter area or gate to form another roll of filter media full of dirt which is likewise housed in a shell. Two stages are utilized with this automatic roll feed mechanism, both for the control of lint and dirt.

In stage 1 for lint and heavy dirt the preferred embodiment uses American Felt Company merchandise RU7025 100-micron filter fabric. In stage 3 for super fine dirt control, American Felt Company merchandise RU7020 5-micron filter fabric is used. There are other filter fabrics suitable for my system. These fabrics include synthetics and wool, but not cotton. Various papers are also suitable but not preferable in the embodiment shown.

The filter media is passed over a gate opening in one part of the structure in such a manner that when the fluid to be filtered is under pump pressure it must flow through the filter media which is over the gate opening. As the filter media becomes charged with dirt or other impurities in the area of the gate opening, the pressure in the tank builds up to a predetermined setting on a pressure control switch. This switch actuates a ratio motor, coupled to the driven or free end of the filter media crossing the gate from the full roll, by means of a spindle, which is turnably attached to the motor shaft. The ratio motor feeds new material over the gate opening. Reeling the dirty media on the spindle mentioned above immediately causes a pressure drop, opens the switch and causes the ratio motor to stop. This cycle continues and the feeding of new material as the pressure build-up occurs intermittently until the filter media is used up, at which point a signal alerts the operator that restocking of the filter rolls is required. New material may be simply installed. The nonvolatile content of the solvent is kept at a safe level by continuous distillation through an automatic still. This still is set such that the amount of solvent distilled will be in the ratio of roughly 5 to 8 gallons per 100 pounds of clothes cleaned to provide for an efficient dry cleaning operation.

The above features are objects of this invention and further objects will appear in the detailed description which follows and will be otherwise apparent to those skilled in the art.

For the purpose of illustration there is shown in the accompanying drawings a preferred embodiment of this invention. It is to be understood that these drawings are for the purpose of example only, however, and that the invention is not limited thereto.

In the drawings:

FIGURE 1 is a schematic view of a preferred embodiment utilizing a spool-type or roll of filter media which is automatically operable to provide fresh filter surface in order to control pressure and flow;

FIGURE 2 is a top plan view of the automatic filter system;

FIGURE 3 is a view in front elevation of the automatic filter system;

FIGURE 4 is an enlarged top plan view, partly in section, of the first stage and the second and third combined stages of the automatic filter system;

FIGURE 5 is a view partly in section and in front elevation of the first stage and combined second and third stages of the automatic filter system;

FIGURE 6 is an enlarged view in fragmentary section showing the top valving arrangement for closing the tanks of the filter stages;

FIGURE 7 is an enlarged view in section taken on the line 7—7 of FIGURE 4;

FIGURE 8 is a top plan view of a spool;

FIGURE 9 is a view in front elevation of a spool;

FIGURE 10 is a top plan view of the spool housing;

FIGURE 11 is a top plan view of the gate used to provide a barrier to the pump flow when the filter media is passed over it;

FIGURE 12 is a fragmentary top plan view showing the filter area between the rollers in the first and third stages shown in FIGURE 5;

FIGURE 13 is a view in front elevation partially in section showing the filter area between rollers;

FIGURE 14 is a bottom plan view of the filter area structure showing the exit opening in bottom of gate structure through which fluid passes after moving through filter media;

FIGURE 15 is a view in vertical section showing the structure of the second stage filter using a cartridge battery system. This stage is optional and does not affect the operation of the system. It is for color and odor removal, if necessary;

FIGURE 16 is a view in section taken on the line 16—16 of FIGURE 15, showing removable cartridges;

FIGURE 17 is a top plan view of the supporting structure of FIGURE 15 with the cartridges and the top plate removed, showing how fluid flows through cartridges and exits back into the tank;

FIGURE 18 is a view in front elevation partially in section of the fourth stage or still of the automatic system; and FIGURE 19 is a wiring diagram of the automatic filter system.

Reference will now be had to FIGURES 1 through 19 showing the preferred embodiment of this invention using the automatic filter roll system. This system is shown schematically in FIGURE 1 where a pump 200 takes solvent from cleaning machine 202 and feeds it through a first stage 204 and subsequently to a combined second and third stage 206 from whence a small portion of the solvent is by-passed through a by-pass valve 208 which splits the flow into two sections. The main flow, which in line 210 is passed back to the cleaning machine tank, and the by-passed flow in line 212 is passed to a fourth distillation stage 214, and then to the cleaning machine.

FIGURES 2 and 3 show the physical arrangement of the various stages and their relationship with the pump. The pump normally pumps the solvent from line 216 through line 218 past valve 220 into the first stage 204. The solvent passes from stage 204 through line 278 to the second and third combined stages 206. On the exhaust side of stages two and three from tank 206, line 221 takes the solvent past valve 222 and line 224 back to the cleaning machine. A bleed off line 212 takes the solvent from the second and third stages to the fourth stage tank 214 and distillate line 228 feeds the solvent back to the line 224. When the tank is to be drained, valve 230 communicating line 224 with line 216 is opened. Likewise, valve 232 communicating with line 222 and the inlet line 234 opening into the pump is opened to provide for drainage of the system under reversed pump flow.

The first stage tank 204 is best shown in FIGURES 4, 5 and 7. As there shown, it is comprised of a shell 240 having an inlet 242 and an outlet 244. The tank is closed by means of a cover 245, as best shown in FIGURES 5 and 6. The tank is adapted to be closed and sealed by means of a hand wheel 247, shown in FIGURES 5 and 6, which is threaded upon a valve shaft or core 249, which cooperates with internal threading of the hand wheel. The valve shaft 249 has a passageway 251 which communicates with an opening or recess provided at the top of the threaded shaft 253, as designated by the reference numeral 255, which communicates through opening 257 to the interior of the tank. The top of the threaded valve member 249 is further provided with an enlarged threaded opening 259 adapted to receive a pressure gauge 261 so that the internal pressure of the tank may be simply measured.

The outlet 244 is positioned underneath a gate structure protected by the filter medium and generally indicated by the reference numeral 246. The filter mechanism comprises a supply roll or reel 248 fitted upon a shaft 250. It is protected by a cylindrical housing 252, having an opening through which the filter media 254 is passed. This filter media as a web feeds around the filter gate 246 and is wound upon a rewind shaft 256 connected to motor 334 and protected by a mating cylindrical housing 252. The shaft structure comprises a reel or spool 263, as best shown in FIGURES 8 and 9. The same type of reel is used on both the supply and the rewind mechanisms. The cylindrical housing is best shown in FIGURE 10, where, by means of flanges 265, it may be attached to a base plate 260 of the tank. Triangular support plate 262 is provided for positioning of the cylindrical cages and the reels fitting within them.

The filter gate 246 is comprised of a U-shaped filter wall housing 266, as shown in FIGURE 11, which supports a plurality of vertical grid rollers 268. The housing fits around the outlet opening 244 to insure that the path of the solvent is directed only through the filter medium as it is positioned against the vertical grid bars. Rollers 270 and 272, positioned on opposite sides of the filter well housing, provide for guiding the filter medium over the grid rollers and between the reels.

The combined second and third stages in tank 206 is best shown in FIGURES 3, 4 and 12–17. As there shown, the tank supports a filter roller and rewind roll, which are alike in all respects to that described in connection with the first stage, except that the parts are reversed. In this case the filter well and filter gate fits over an outlet 276, shown at the bottom of the lower right hand corner of FIGURE 4, while inlet 278 is shown in FIGURE 15 feeding into a battery of cylindrical cartridges. In this combined second and third stage the second stage is represented by the battery of cylindrical cartridges, while the third stage is represented by the filter roll and filter gate mechanism.

As shown in FIGURE 15, the second stage provides for an inlet through line 278 to the interior of the battery of cartridges 269. The cartridges are formed of annular wire mesh members 279 and 281 held in position by caps 283. They are filled with granular filter or adsorption media, such as activated carbon. The cartridges are supported upon nipples 280 that are fitted into a housing 282 supported upon the tank base. A spider 284 connects a hub 286 to the bottom of the housing to provide support for the threaded shaft 288. This shaft supports a top plate 290 having cartridge self-supporting cones 292 fitted in a circular or peripheral pattern to provide for support of the cartridges. A lock nut 294 fits upon the shaft to secure a cover plate 296 upon the housing. The housing is provided with flanges 298 so that it may be secured to the base plate 300 of the tank.

The fourth stage or distillation stage 214 is best shown in FIGURES 2, 3 and 18. As there shown, it has an inlet 212 opening into the tank 301. The still is of conventional construction having a V-shaped bottom 302 with an outlet 304 for oil and grease. Although contact strip heaters are shown, it will be understood that submerged heaters of the rod-type not in direct contact with the tank may be employed. A float level 306 is provided for proper operation of the still. The still has a top connection 308 connecting with the condenser 310 for condensation of the distilled vapors. The condenser is provided with cooling water pipes 312 and an outlet 228 for the condensed solvents which may be recycled to the system.

The wiring diagram is shown in FIGURE 19. A source of current 320 provides for passage of current through a main switch 322 to the pump motor. A pressure safety switch 324 is provided to interrupt the circuit should the safe level of pressure within the system be exceeded. Heaters 326, controlled by a thermal switch 328, are connected in parallel for operation of the still.

A timer switch 329 controls distillation in direct ratio to the amount of cleaning to be done. For example, 100 pounds of cleaning would require 5 gallons of solvent to be distilled. The cleaner operator would simply set the timer dial to 100. As the dial is graduated in pounds of cleaning rather than gallons or time, the still would distill 5 gallons (in one hour) and shut off. Likewise, a ratio motor 330 is connected in parallel and is controlled by a pressure switch 332 for control of the filter roll in the first stage. A similar ratio motor 334, controlled by a pressure switch 336, is similarly connected in parallel for control of the filter roll in the third stage. The pressure switch, as it will be understood, is positioned on the upstream side of the tanks 204 and 206, where build up in pressure caused by filter media that becomes progressively clogged by dirty solvent will cause the operation of the switches and the operation of the respective ratio motors.

OPERATION

This invention utilizes the concept of providing a multiplicity of single purpose filtration stages where each stage may eliminate lint, dirt, fatty acid, and discoloration, although not necessarily in that order. Disposable filter elements are employed to obviate the necessity of using diatomaceous earth and other powders used by the trade, which, together with dirt and fats, cause the formation of the residue known as "muck."

The preferred embodiment uses a plurality of separate stages each designed for a particular function. However, as appears in the description heretofore, the system is designed for presenting fresh material of the filter medium as the filter media tends to become clogged through the use of the special rolls of filter medium and the ratio motors for controlling the movement of the web across the filter area.

In the preferred system, dirty solvent from the cleaning machine tank is pumped by the pump 200 into the first stage 204. In this stage the solvent enters the tank at the bottom inlet 242 and fills the tank. Its only path for escape from the tank is through the filter media, which is the web of filter material between the stock roll in housing 252 and the wind up roll in the other housing. The web 254 is presented across the filter gate and the solvent is filtered therethrough over the outlet opening 244. When the filter media becomes charged with dirt over the flow opening, the pressure builds up to a predetermined setting on a pressure control switch, which in the first stage may be set at 15 pounds. This switch is designated by reference numeral 332 in FIGURE 19 and operates the motor 330, which is coupled to the driven end, i.e., the empty spool at the beginning of the operation. The ratio motor causes the driving of this spool to feed new material over the flow opening, which will immediately drop the pressure, opening the switch, and causing the ratio motor to stop. This cycle continues automatically until the filter material is used up and at this point a signal alerts the operator.

After passing through the first stage, the fluid passes through conduit 278 into the interior of the shell 282 of the second stage, shown in FIGURES 4 and 15. The fluid then passes through the interior of the filter cartridges down to the nipples 280 into the interior of the tank 206. These filter cartridges may be filled with activated carbon to adsorb colors and odor components.

From the interior of the tank, the solvent passes to the third stage comprising a roll material in the web presented across the filter gate opening in the same identical fashion as described in connection with the first stage description. After passing through the filter web, which is controlled by ratio motor 334 and a pressure switch 336, the solvent leaves through the outlet 276. From the outlet 276 the solvent passes through the metering valve 208 to split part of the solvent in line 212 going to the fourth stage 214 and the other part in line 210, into the cleaning machine tank. In the fourth stage still, the non-volatile contents of the solvent, such as fatty acid oils and the like, is kept at a safe level by separation from the "perk" or the perchloroethylene solvent through distillation. The non-volatile content is controlled in the system by continuous distillation through the automatic still, which, for purpose of example, may be such that the amount of solvent distilled will be in the ratio of about 5 to 8 gallons distilled per 100 pounds of clothes cleaned. In the still the perchloroethylene is distilled off and passes through the top outlet 308 into the condenser and is there condensed to a liquid in line 228, which is then fed back in line 228 to the main line 224 leading to the cleaning machine tank.

In the still the perchoroethylene, which boils at about 250° F. is separated from all non-volatile components. These nonvolatile components may be as much as one gallon in 1100 pounds of dry cleaning, and they can be drained off through the line 304 in the still at suitable intervals.

The automatic system in the preferred embodiment avoids the difficulty caused by build up in pressure and corresponding loss of flow through the use of static or cartridge filters. The filter material used in the rolls, which as previously mentioned, may be in any type of stored system, such as folded like an accordian, and then being fed out through a web over a gate or opening, provides a filter means that effectively and efficiently filters out impurities in the solvent. The build up of pressure is fully controlled by the pressure switches and ratio motors which cause the feeding of new material by winding up the rewind spools to feed the new material across the filter gate and grid bars. In this system, as aforementioned, the first stage may be set, as an example, at 15 pounds for operation of the pressure switch while the third stage can be set at 12 pounds, which at the lower setting prevents back up on the upstream side of the first stage to prevent the first stage switch from improperly actuating the system from clog up in the third stage.

The automatic system is particularly designed for simple drainage through the arrangement of the various pipes and conduits and valves. To pump out the first, second and third stages, valve 235 leading into the pump is closed, valve 220 leading into the first stage is closed, valve 230 is opened connecting the third stage with the pump, valve 222 is closed, and valve 232 is opened. Then the air vent on the top of tank 204 is opened and discharge to the cleaning machine tank will be effected. The termination of discharge can be observed when air commences to be sucked into the pump signifying the end of the drainage. The system is ready for a new operation by reversing the above noted procedures.

Various changes and modifications may be made within this invention as will be readily apparent to those skilled in the art. Such changes and modifications are within the scope and teaching of the invention as defined by the claims appended hereto.

What is claimed is:

1. A dry cleaning system for removing lint, dirt, color, odor and non-volatile liquids from dirty dry cleaning solvent which comprises a dry cleaning machine connected to a plurality of separate stages connected in sequence, said stages comprising first and second stages having a filter means automatically movable to present fresh filter media as it becomes clogged, said means comprising a pressure switch responsive to the back pressure of said stream to actuate a control means for moving said filter media across the stream comprising a tank having an inlet and an outlet, a supply of filter media in web form, means for feeding said filter media across a filter area to filter media take-up means, said inlet communicating with one side of the filter media at said filter area and said outlet communicating with the opposite side of the filter media at said filter area, and means for automatically moving the filter media as it becomes clogged to present fresh filter media to the filter area, the first stage filter media being movable responsive to a pressure switch set at a higher pressure than the second stage, a third stage comprised of a battery of replaceable cartridge filters and a still for distilling solvent from nonvolatile liquid, said still being connected in series between the last filter stage and the cleaning machine and a separate line from said last stage to the cleaning machine by-passing the still.

2. The dry cleaning system of claim 1 in which the filter media is fed from a roll of filter media across the filter area to a take-up roll and a ratio motor is connected to the take-up roll, said motor being controlled by said pressure switch.

3. The dry cleaning system of claim 1 in which the filter media is fed from a roll of filter media across the filter area to a take-up roll, said filter area being defined as an outlet opening in a closed housing having an opening defining said filter area, and guide means defined by rollers supported by said housing to guide the web of filter media across said opening, and a ratio motor is connected to the take-up roll, said motor being controlled by said pressure switch.

4. The dry cleaning system of claim 1 in which the filter media supply is mounted upon a reel in a sealed container, an inlet to the container for said solvent, a take-up reel for the filter media as it moves past said filter area, said filter area being defined by guide means for said web between the supply and take-up reels to present said web in covering relation across an outlet opening for said solvent.

5. The dry cleaning system of claim 1 in which the battery of sepraate cartridge filters is comprised of a plurality of annular cylindrical cartridges filled with discrete filter media, said cartridges being supported by a self centering guide plate having means for clamping the cartridges in position.

6. The dry cleaning system of claim 5 in which the self centering guide plate comprises a manifold having nipple means receiving the cartridges in guided relationship and communicating with said manifold.

References Cited

UNITED STATES PATENTS

| | | | |
|---|---|---|---|
| 337,486 | 3/1886 | Derham | 210—90 X |
| 1,695,811 | 12/1928 | Manning | 210—387 |
| 1,810,965 | 6/1931 | Hopkins | 210—323 |
| 1,906,417 | 5/1933 | Renfew et al. | 210—90 X |
| 2,152,900 | 4/1939 | Manning | 210—106 X |
| 2,737,299 | 3/1956 | Tursky | 210—345 X |
| 2,904,184 | 9/1959 | Daley et al. | 210—323 |
| 2,946,445 | 7/1960 | Tursky | 210—232 |
| 3,097,164 | 7/1963 | Shields | 210—167 X |
| 3,219,191 | 11/1965 | Suchy | 210—266 |
| 3,224,587 | 12/1965 | Schmidt | 210—387 X |
| 2,114,776 | 4/1938 | Davis | 68—18 |
| 2,359,138 | 9/1944 | Martin | 210—167 X |
| 2,836,045 | 5/1958 | Smith | 210—167 X |
| 2,964,934 | 12/1960 | Shields | 68—18 |
| 2,979,375 | 4/1961 | Kircher et al. | 210—167 X |
| 2,982,412 | 5/1961 | Hirs | 210—138 X |
| 3,291,562 | 12/1966 | Anderson | 210—73 X |
| 3,310,172 | 3/1967 | Beduhn | 210—167 X |

REUBEN FRIEDMAN, *Primary Examiner.*

F. A. SPEAR, JR., *Assistant Examiner.*

U.S. Cl. X.R.

210—134, 143, 167, 254, 259, 323, 387